Nov. 26, 1963  A. V. L. C. DEBRIE  3,112,053
MEANS FOR GUIDING FILM IN CINEMATOGRAPHIC APPARATUS
Filed Dec. 28, 1960
Fig:1
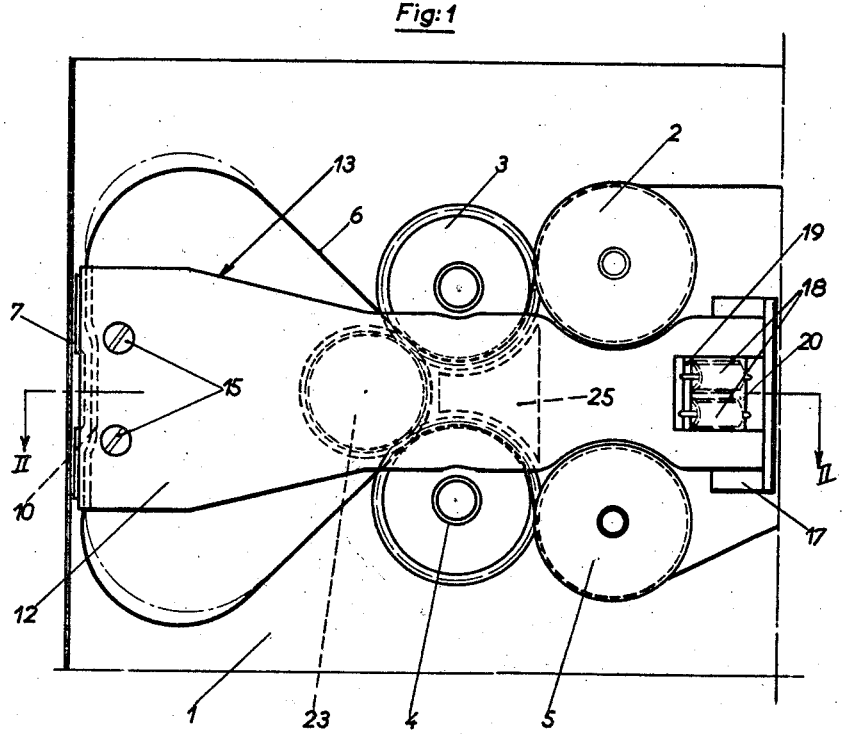
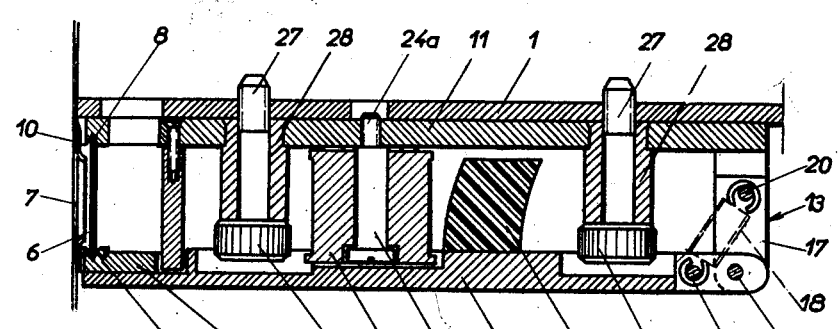
Fig:2
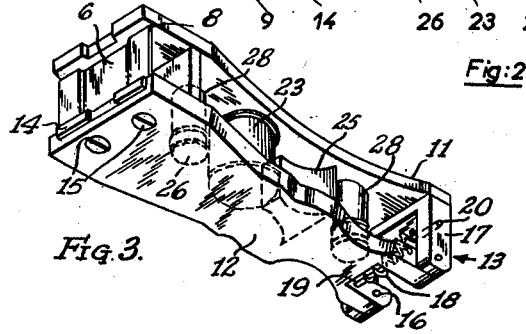
Fig:3

United States Patent Office 3,112,053
Patented Nov. 26, 1963

3,112,053
MEANS FOR GUIDING FILM IN CINEMATO-
GRAPHIC APPARATUS
André Victor Léon Clément Debrie, 111 Rue Saint-Maur,
Paris, France
Filed Dec. 28, 1960, Ser. No. 78,996
Claims priority, application France Feb. 18, 1960
7 Claims. (Cl. 226—89)

This invention concerns a device generally called a "bed" which is situated behind the objective lens of a cinematographic apparatus and guides the film as it unwinds to this level and crosses through the optical system of the apparatus.

Various kinds of beds are known and used in cameras and projectors. In a preferable form, the device properly called guiding means, comprises parallel V-section grooves with openings face to face in which the film slides. Suitable resilient means cause the film to adopt the best attitude while it passes behind the objective lens.

Although the present invention is applicable to this kind of bed it is not limited solely to this kind.

According to the present invention the guiding means for the film is contained in a substantially parallel sided frame, and the principal opposing walls of the frame carry, along the length of one side film guiding means. These may have a V-like cross-section. One of the walls is hinged close to an edge distant from the guiding means about an axis parallel to them. In this way the hinged wall can be opened like a door to give access to the interior of the frame and can be returned to close the frame.

A spring or other retaining device is preferably used to keep the frame either open or shut and is arranged so that all intermediate positions of the hinged face are unstable.

According to a preferred form of the invention, the said frame comprises a removable assembly fixed to the rest of the apparatus by rapid fixing means such as screws preferably with knurled button heads, which are housed inside the frame and are accessible after the hinged wall has been opened. These screws pass through a wall of the frame and engage in tapped holes in a plate which serves to support the various pieces which go to make up the apparatus.

The description which follows is given by way of example with reference to the accompanying drawings in which:

FIG. 1 is a schematic side elevation of a device according to the invention,

FIG. 2 is a section along II—II of FIG. 1, and

FIG. 3 is a perspective illustration of the structure of the invention, this structure being shown in FIG. 3 on a scale smaller than in FIGS. 1 and 2.

In FIG. 1 the plate 1 of a camera, that is to say, that plate which supports the majority of the component members, carries idler rollers 2 and 5 mounted freely on shafts integral with the plate and sprocketed driver rollers 3 and 4. The film 6 coming from the supply reel of the apparatus rolls out on the rollers 2 and 3, passing in front of the aperture 7 in which is the objective lens (not shown) and returning to the "take-up" reel over members 4 and 5.

While passing behind the aperture 7, the lateral attitude of the film is continuously determined by the parallel V-shaped guides 8, 9 and the form of the passage 10 gives the film its required curvature.

According to the present invention these V-shaped guides 8, 9 are carried by the opposing walls 11, 12 of the parallel sided frame 13 (FIG. 3), and the guide 9 may be formed as one piece with member 14 which is fixed with two screws 15 to the plate or wall 12.

This wall 12 is hinged about a pin 16 which is parallel to the guides 8, 9 and carried in a bracket 17 integral with the plate or wall 11. A double spring 18 is fastened between the pins 19, 20 which are respectively integral with the wall 12 and the bracket 17. The angle subtended by pins 19, 20 at member 16 is slightly obtuse so that the maximum extension of the double spring 18 occurs when the plate 12 lies between its extreme angular positions, that is between completely shut as in FIGURE 2 and completely open. These two positions contain an angle of some 90°.

The frame includes moreover another idler roller 23 which is freely mounted on a shaft 24 fixed by member 24a to the fixed plate or wall 11, and the pivoting plate or wall 12 carries a member 25 of plastic, say, whose cross-section is bi-concave (see FIG. 1). This cross-section mates with the circular cross-sections of the rollers 3 and 4. The idler 23 and the member 25 of the box 13 are designed to improve the guiding of the film to its engagement with the sprocketed rollers 3 and 4.

The film passes between the roller 3 and the adjacent concave face of the member 25, and leaves the roller 3 tangentially because of the presence of the idler roller 23. In the same way, the roller 23 causes the film to impinge tangentially on the driven roller 4 whence it is channelled between the roller 4 and the other concave face of the member 25. Thus despite the periodic withdrawals of the film due to its stepwise movement in front of the aperture 7 the film always rolls correctly on the sprocket wheels. The different positions adopted by the film due to the withdrawals are illustrated in FIG. 1 by the heavy and chain-dotted lines particularly in the sector between the roller 23 and the aperture 7.

The frame has the form of a movable assembly easily and rapidly fixable on the plate 1 by at least two knurled buttons 26—26 integral with screws 27—27 which engage in tapped holes in the plate 1. These screws traverse the sleeves 28—28 integral with the fixed wall 11 of the box.

It is clear that in order to set up or disconnect the frame it is simply sufficient to open the hinged wall 12 and to adjust, in the appropriate sense, the knurled buttons 26 which are thus made accessible.

At the same time, it is simple to set up the film in the open frame by passing it between members 2, 3, 23 through the guide so that one of the edges of the film engages the guide 8 and then back between members 23, 4, 5. The frame is then shut by snapping-to the pivoting wall 12, so that the other guide 9 engages the free edge of the film in the appropriate place and the member 25 automatically adopts its position between the members 3, 23, 4. The re-entrant curves of member 25 allows the free withdrawal of the wall or door 12.

I claim:

1. A frame for a camera assembly, said frame including an elongated stationary wall adapted to be detachably connected to part of a camera in a position extending substantially parallel to the optical axis and having front and rear ends; a movable wall of substantially the same length and width as said stationary wall movable to and from a closed position where said movable wall is parallel to, aligned with and spaced from said stationary wall, said movable wall also having front and rear ends, the camera having an exposure aperture located between the front ends of said walls when the frame is connected to the camera and said movable wall is in said closed position thereof; a pair of substantially identical film guides adapted to respectively engage film at the opposite side edges thereof, said guides being respectively carried by said walls at said front ends thereof in alignment with each other for guiding film past said aperture and each film guide providing a continuous support for an edge of the film at a portion thereof aligned with, immediately prior to, and immediately subsequent to said exposure aperture, whereby the film guide which is carried by said movable wall moves with the latter; and support means carried by said stationary wall adjacent said rear end thereof and supporting said movable wall adjacent the rear end of the latter for turning movement to and from said closed position about an axis perpendicular to the optical axis so that said movable wall may be turned away from said closed position thereof and away from said stationary wall to give access to the space between the walls during threading of the film whereby at this time the film will be engaged only by the film guide carried by said stationary wall, whereby upon return of said movable wall to said closed position thereof, the film guide carried by said movable wall will engage and guide the film at the edge thereof distant from the guide which is carried by the stationary wall.

2. A frame as recited in claim 1 and wherein a screw means is carried by said stationary wall and is accessible when said movable wall is turned away from said closed position thereof for removably fixing said stationary wall to a plate of the camera.

3. A frame as recited in claim 1 and wherein a spring means connected to said support means and movable wall urges said movable wall toward said closed position thereof.

4. In a camera, in combination, a first camera wall formed with an exposure aperture; a second camera wall perpendicular to said first wall; sprocket means carried by said second wall; a frame connected to said second wall and including an elongated stationary wall extending generally parallel to the optical axis and fixed directly to said second wall and a movable wall spaced from, aligned with and parallel to said stationary wall, said movable and stationary walls respectively having front ends between which said aperture is located and rear ends respectively distant from said front ends and said movable, and stationary walls respectively carrying a pair of substantially identical film guides adjacent said front ends thereof for engaging the side edges of a film strip to guide the latter past said aperture, said film guides providing continuous support for the film at its side edges at the region of the film aligned with and located just before and after said aperture; support means carried by said stationary wall adjacent said rear end thereof and supporting said movable wall for turning movement at the rear end of said movable wall about an axis substantially perpendicular to the optical axis to and from a closed position where said movable wall is parallel to said stationary wall, so that when said movable wall is displaced from said closed position thereof access may be had to the space between said walls for threading film in the camera and for placing the film in engagement with the film guide carried by said stationary wall, the film guide carried by said movable wall engaging the film upon movement of said movable wall to said closed position thereof; and additional guide means carried by at least one of said walls of said frame in the space between said movable and stationary walls thereof and cooperating with said sprocket means carried by said second wall for participating in the guiding of the film to and from said aperture.

5. In a camera as recited in claim 4, said additional guide means including a pair of film guiding elements respectively carried by said movable and stationary walls and cooperating with said sprocket means carried by said second camera wall.

6. In a camera as recited in claim 4, said sprocket means including a pair of film advancing sprocket rollers and said additional guide means being in the form of a block carried by said movable wall and located between the latter rollers when said movable wall is in its closed position to coperate with said rollers for guiding film thereon, whereby when said movable wall is moved away from said closed position thereof said block is displaced from between said rollers to give free axis thereto for threading the film.

7. In a camera as recited in claim 4, said sprocket means including a pair of film advancing sprocket rollers and said additional guide means being in the form of a third roller rotatably carried by one of said walls and located adjacent and cooperating with the latter rollers for directing the film tangentially with respect thereto.

References Cited in the file of this patent

UNITED STATES PATENTS

| | | |
|---|---|---|
| 216,777 | Barry | June 24, 1879 |
| 2,225,021 | Schwenk | Dec. 17, 1940 |
| 2,526,647 | Foster et al. | Oct. 24, 1950 |
| 2,651,542 | Meyer | Sept. 8, 1953 |

FOREIGN PATENTS

| | | |
|---|---|---|
| 850,785 | France | Dec. 26, 1939 |
| 340,414 | Switzerland | Sept. 30, 1959 |